(12) United States Patent
Ayi-Yovo et al.

(10) Patent No.: US 10,782,468 B2
(45) Date of Patent: Sep. 22, 2020

(54) METHOD FOR MANUFACTURING AN OPTICAL DEVICE

(71) Applicant: STMicroelectronics SA, Montrouge (FR)

(72) Inventors: Folly Eli Ayi-Yovo, Grenoble (FR); Cédric Durand, La Terrasse (FR); Frédéric Gianesello, Saint Alban Leysse (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 15/730,415

(22) Filed: Oct. 11, 2017

(65) Prior Publication Data
US 2018/0106954 A1    Apr. 19, 2018

(30) Foreign Application Priority Data

| Oct. 13, 2016 | (FR) | 16 59923 |
| Oct. 13, 2016 | (FR) | 16 59924 |
| May 16, 2017 | (FR) | 17 54320 |

(51) Int. Cl.
| *F21V 8/00* | (2006.01) |
| *G02B 6/02* | (2006.01) |
| *G02B 6/36* | (2006.01) |
| *G02B 6/30* | (2006.01) |
| *B23K 26/00* | (2014.01) |
| *B23K 26/364* | (2014.01) |
| *B23K 26/402* | (2014.01) |
| *B23K 26/0622* | (2014.01) |
| *G02B 6/12* | (2006.01) |
| *B23K 103/00* | (2006.01) |

(52) U.S. Cl.
CPC ............ *G02B 6/0065* (2013.01); *B23K 26/00* (2013.01); *B23K 26/0624* (2015.10); *B23K 26/364* (2015.10); *B23K 26/402* (2013.01); *G02B 6/02152* (2013.01); *G02B 6/12004* (2013.01); *G02B 6/30* (2013.01); *G02B 6/3652* (2013.01); *B23K 2103/54* (2018.08); *G02B 2006/12176* (2013.01)

(58) Field of Classification Search
CPC .................. G02B 6/0065; G02B 6/02152; G02B 6/3652; G02B 2006/12176
See application file for complete search history.

(56) References Cited

U.S. PATENT DOCUMENTS

| 5,239,601 A * | 8/1993 | Denis ..................... G02B 6/30 216/24 |
| 5,384,872 A * | 1/1995 | Jacobs-Cook ......... G01D 5/268 385/31 |
| 6,086,776 A * | 7/2000 | Maynard .............. G02B 6/4226 216/24 |

(Continued)

*Primary Examiner* — Queenie S. Dehghan
(74) *Attorney, Agent, or Firm* — Slater Matsil, LLP

(57) ABSTRACT

The present invention relates to a method for manufacturing an optical device comprising forming a first trench in a glass plate and a second trench perpendicular to the first trench, wherein the first trench has an end opening into the second trench. The trenches are treated with hydrofluoric acid. The first trench is filled with a material to form a waveguide, and a mirror is formed on the wall of the second trench opposite the waveguide. An encapsulation layer is deposited over the glass plate, waveguide and second trench.

30 Claims, 3 Drawing Sheets

(56) References Cited

U.S. PATENT DOCUMENTS

| | | | |
|---|---|---|---|
| 2003/0123806 A1 | 7/2003 | Erben | |
| 2003/0219208 A1* | 11/2003 | Kwon | G02B 6/30 385/49 |
| 2004/0223682 A1* | 11/2004 | Ding | G02B 6/12004 385/14 |
| 2005/0031291 A1* | 2/2005 | Gao | G02B 6/30 385/142 |
| 2005/0117831 A1* | 6/2005 | Komiya | G02B 6/3636 385/14 |
| 2006/0051045 A1* | 3/2006 | Qiu | G02B 6/3636 385/137 |
| 2007/0140636 A1* | 6/2007 | Tanaka | G02B 6/12002 385/129 |
| 2011/0129181 A1 | 6/2011 | Bolle | |
| 2012/0189245 A1* | 7/2012 | Bowen | G02B 6/4214 385/14 |
| 2013/0004118 A1* | 1/2013 | Castagna | G02B 6/4214 385/14 |
| 2013/0330034 A1* | 12/2013 | Feng | G02B 6/423 385/14 |
| 2014/0035104 A1* | 2/2014 | Bratkovski | H01L 21/02381 257/616 |
| 2015/0160413 A1* | 6/2015 | Kuo | G02B 6/12004 385/14 |
| 2016/0306110 A1 | 10/2016 | Lambert | |

\* cited by examiner

METHOD FOR MANUFACTURING AN OPTICAL DEVICE

CROSS-REFERENCE TO RELATED APPLICATIONS

This application claims priority to French Application No. 1659923, filed on Oct. 13, 2016, French Application No. 1659924, filed on Oct. 13, 2016, and French Application No. 1754320, filed on May 16, 2017, which applications are hereby incorporated herein by reference.

TECHNICAL FIELD

The present application concerns a method for manufacturing an optical device.

BACKGROUND

Optical signals may be used for transmitting data. Optical devices such as that shown in FIG. 1 may be used for providing a link between an optical fiber and one or more optical signal processing circuits.

FIG. 1 is a sectional view of an optical device 10 adapted to transmit a light beam 12 from an optical fiber to an optical signal processing circuit. The device 10 is formed in a glass plate 13, and comprises a waveguide 14 and a mirror 16. The waveguide 14 is adapted to receive the light beam 12 and guide it towards the mirror 16. The waveguide 14 is formed by engraving on the upper face of the plate 13. The mirror 16 is positioned at the end of the waveguide 14 and is inclined so as to direct the light beam 12 in a direction substantially orthogonal to the main surface of the plate 13, for example towards an optical signal processing circuit positioned above the plate 13. The device 10 further comprises an encapsulation layer 17 which covers the upper face of the waveguide 14, the upper face of the mirror 16 and the accessible upper face of the plate 13.

A method is proposed herein for improving the performance of the waveguide/mirror device and minimizing the number of manufacturing steps.

SUMMARY

The present application concerns a method for manufacturing an optical device, and more particularly a method for manufacturing an optical device comprising a waveguide and a mirror.

Embodiments provide a method for manufacturing an optical device in a glass plate comprising forming a first trench in the glass plate and a second trench perpendicular to the first trench, wherein the first trench has an end opening into the second trench. The glass plate is treated with hydrofluoric acid to smooth the surfaces of the trenches. The wall of the second trench opposite the opening of the first trench is covered with a mirror, and the first trench is filled with a material having a refractive index different from that of the glass to form a waveguide. An encapsulation layer is deposited over the glass plate, waveguide and second trench.

According to embodiments, the first trench and the second trench are formed by laser engraving.

According to embodiments, the laser is a pulsed laser in which the duration of the pulses is in the range from 2 to 500 femtoseconds.

According to embodiments, the mirror is inclined relative to the vertical.

According to embodiments, the mirror is inclined at an angle in the range from 40 to 50 degrees.

According to embodiments, the width of the second trench is less than 50 µm.

According to embodiments, the refractive index of the glass of the glass plate is lower than the refractive index of the material filling the first trench, and the refractive index of the material of the encapsulation layer is lower than the refractive index of the material filling the first trench.

According to embodiments, the mirror may be curved.

According to embodiments, the mirror is made of aluminum, of copper, or of an alloy of aluminum and copper.

According to embodiments, the width of the first trench is in the range from 5 to 10 µm.

According to embodiments, the encapsulation layer is made of silicon oxide or of a polymer.

According to embodiments, the material filling the first trench is a polymer.

Embodiments provide an optical device comprising a waveguide and a mirror formed in a glass plate, said waveguide having one of its ends directed towards the mirror, said oblique mirror being separated from the end of the waveguide by a distance of less than 60 µm.

BRIEF DESCRIPTION OF THE DRAWINGS

These characteristics and advantages, together with others, are disclosed in detail in the following description of particular embodiments provided in a non-limiting way, in relation to the attached drawings, in which.

DETAILED DESCRIPTION OF ILLUSTRATIVE EMBODIMENTS

Identical elements have been denoted by identical references in the different figures; furthermore, the various figures are not drawn to scale. For the sake of clarity, only the elements useful for understanding the embodiments described have been shown and detailed.

In the following description, when reference is made to qualifiers of relative position, such as the terms "above", "upper", etc., or to qualifiers of orientation, such as the term "vertical", it is the orientation in the figures that is being referred to. Unless specified otherwise, the expression "on the order of" signifies to within 10%, preferably to within 5%.

Figure 2:
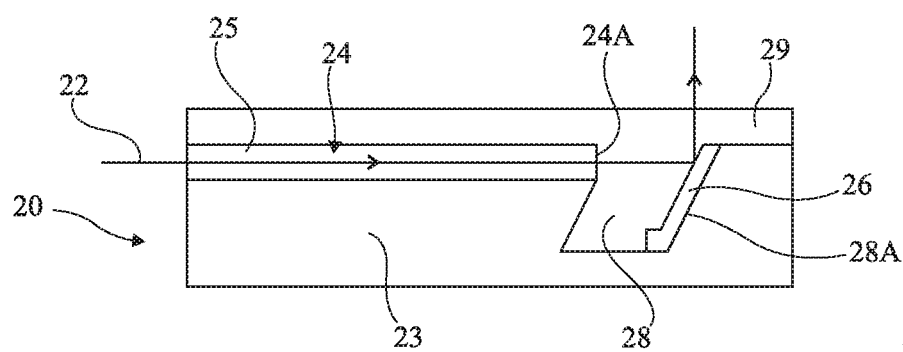
FIG. 2 is a sectional view of an embodiment of an optical device.

FIG. 2 is a sectional view of an embodiment of an optical device 20 adapted to transmit a light beam 22, received from an optical fiber for example, to an optical signal processing circuit (not shown) which is positioned, for example, above the optical device. The device 20 is formed in a support plate 23, made of glass for example, and comprises a waveguide 24 and a mirror 26, both of which are covered by an encapsulation layer 29.

Figure 1:
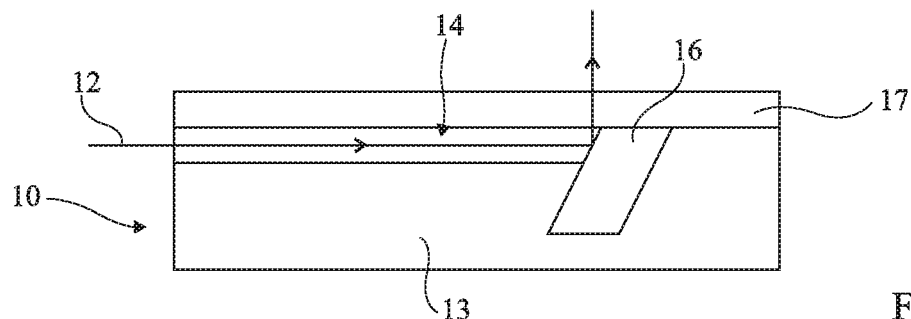
FIG. 1, described above, is a sectional view of an optical device.

The waveguide 24 is positioned so that one of its ends 24A is directed towards the mirror 26. Thus the light beam 22 is transmitted by the waveguide 24 and then reflected by the mirror 26. The mirror 26 is inclined so as to reflect the light beam in a direction which is, for example, orthogonal to the main surface of the plate 23, for example towards an optical signal processing circuit positioned above the plate 23. By contrast with the device of FIG. 1, the end 24A of the waveguide is not in contact with the mirror 26, thereby avoiding any problem of defects in the waveguide/mirror interface. To prevent the transformation of the beam 22 in the interval between the end 24A of the waveguide and the mirror 26, the mirror is positioned at a distance of less than 50 µm from the end 24A, for example at a distance in the range from 30 to 50 µm.

The waveguide 24 is formed of a core 25 and a sheath, in a conventional way. The sheath is formed by the plate 23 and by the encapsulation layer 29. The core 25 has a cross section of substantially square shape, such that it has a shape factor (a ratio of height to width) on the order of 1. The height and width of the core 25 are, for example, in the range from 5 to 10 µm. In this case, the waveguide 24 is single-mode for wavelengths in the range from 1300 to 1500 nm. These dimensions are, for example, adapted to those of a single-mode optical fiber. The core 25 of the waveguide 24 is made of a material having a higher refractive index than that of the glass of the plate 23. This material is, for example, a polymer, for example in the form of a dry stretchable film shaped by rolling (that is to say one not requiring a solvent, known by the term "dry film"). The difference in the refractive index between the glass of the plate 23 and the material of the core 25 of the waveguide 24 is in the range from $10^{-3}$ to $10^{-2}$, for example on the order of $5 \times 10^{-3}$. An example suitable polymer material is that distributed by the Elga Europe company in the form of a dry stretchable film, under the trade name "Ordyl SY 317."

The mirror 26 is positioned on a wall 28A of a trench 28, this wall 28A being opposite the end 24A of the waveguide 24. As shown in FIG. 2, the mirror 26 may entirely cover the wall 28A and extend on to the bottom of the trench 28, but, by way of variant, the mirror 26 could rest only on a portion of the wall 28A facing the end 24A. The mirror 26 is inclined relative to the vertical at an angle which, for example, is in the range from 40 to 50 degrees, being on the order of 42 degrees. The mirror 26 is made of metal, for example copper, aluminum, or an alloy of copper and aluminum.

The encapsulation layer 29 covers the upper face of the waveguide 24, the upper face of the mirror 26 and the accessible upper face of the glass plate 23. The layer 29 also fills the trench 28. The encapsulation layer 29 is made of a material having a smaller refractive index than that of the material of the waveguide. The difference in the refractive index between the glass of the plate 23 and the material of the encapsulation layer 29 is on the order of $10^{-5}$. The layer 29 is, for example, made of silicon oxide or a polymer. The thickness of the layer 29 is, for example, in the range from 5 to 50 µm, for example 10 µm.

FIGS. 3A, 3B and 4 to 9 illustrate successive steps of an embodiment of a method for manufacturing the optical device of FIG. 2.

Figure 3A:
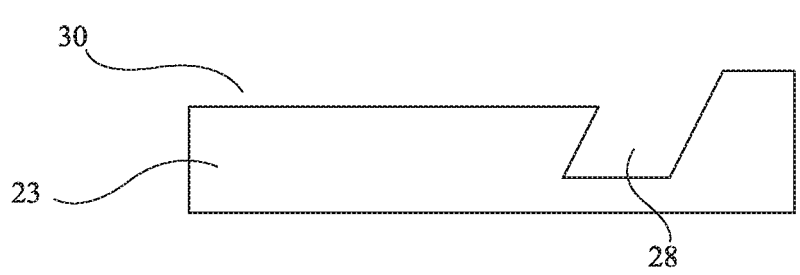
FIGS. 3A and 4 to 9 are sectional views illustrating steps of an embodiment of a method of manufacturing the optical device of FIG. 2.
Figure 3B:
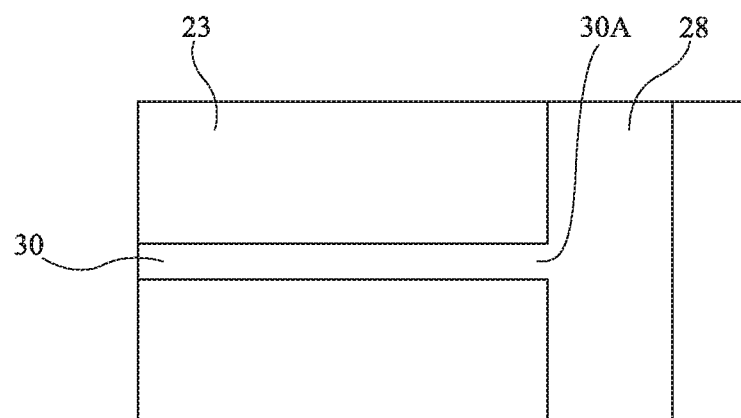
FIG. 3B is a top view corresponding to FIG. 3A.

FIGS. 3A and 3B are, respectively, a sectional view and a top view of the same step of the method. In this step, the trench 28 and a trench 30 are engraved in the glass plate 23.

The trench 28 is engraved obliquely relative to the direction normal to the surface of the plate 23. For this purpose, the glass plate 23 is, for example, positioned on an oblique support and then engraved with a vertical laser beam. Unlike what is illustrated, the bottom of the trench 28 is in practice substantially rounded.

The depth of the trench 28 is, for example, in the range from 30 to 50 µm. The trench 28 has, for example, a rectilinear form when viewed from above.

The trench 3o has a cross section which, for example, is semi-circular in form with a depth in the range from 5 to 10 µm. The trench 30 has, for example, a rectilinear form when viewed from above. One end 30A of the trench 30 opens into the trench 28. In the example shown in FIG. 3B, the trenches 30 and 28 form a T.

To form the trenches 28 and 30, the plate 23 is scanned by a laser beam. The laser beam is produced by a laser whose pulses have a duration in the range from 2 to 500 femtoseconds, currently called a femtosecond laser. By way of example, the trenches 28 and 30 may be formed with pulses having energies of more than 500 nJ and a duration on the order of 100 fs. This energy is calculated on the basis of the dimensions of the cavity to be formed with a pulse. The femtosecond laser emits these pulses, for example, at a frequency in the range from 10 to 500 kHz. An advantage of the use of a femtosecond laser is that the duration of the pulses is rather short relative to the thermal relaxation time of the material. This property allows precise machining of the material and limits the thermal effects on the periphery of the ablated area.

Exposure to the femtosecond laser modifies the physical properties of the areas exposed when engraving is initiated. However, after engraving the trenches do not have the desired dimensions, and their walls have a degree of roughness. Hydrofluoric acid etching is then performed, in order to obtain the desired dimensions by removing material in the area exposed to the laser, and in order to reduce the roughness of the trenches.

FIGS. 4 to 9 are sectional views illustrating the steps of the method for manufacturing the device of FIG. 2 following the step illustrated in FIGS. 3A and 3B.

Figure 4:
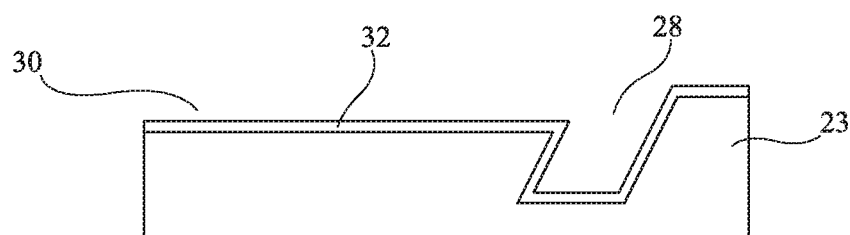

In the step of FIG. 4, a layer of resin 32 is deposited in an appropriate way on the surface of the glass plate 23. The layer 32 is, for example, made of resin sensitive to UV radiation. The thickness of the layer 32 is in the range from 3 to 15 µm. The layer of resin 32 is deposited, for example, by spinning or by rolling.

Figure 5:
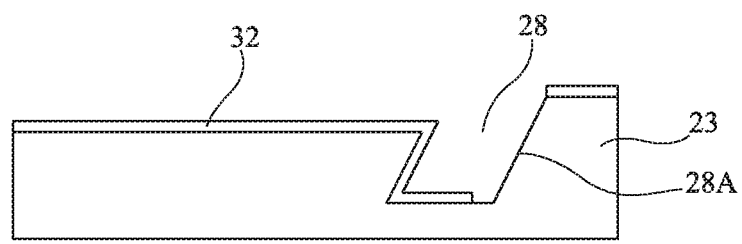

In the step of FIG. 5, the portion of the layer of resin 32 covering the wall 28A of the trench 28 facing the end 24A of the waveguide 24 (see FIG. 1) is removed by masking. More particularly, the structure of FIG. 4 is masked, exposed to UV radiation, and then etched by wet etching.

Figure 6:
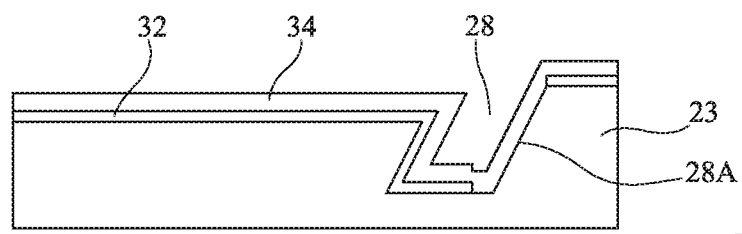

In the step of FIG. 6, a layer of metal 34 is deposited in an appropriate way on the structure of FIG. 5. The layer 34 is, for example, made of aluminum, copper, or an alloy of aluminum or copper. The thickness of the layer 34 is in the range from 10 nm to 1 µm, being on the order of 100 nm. The layer 34 is, for example, deposited by a cathode sputtering method, or physical vapor deposition (PVD).

Figure 7:
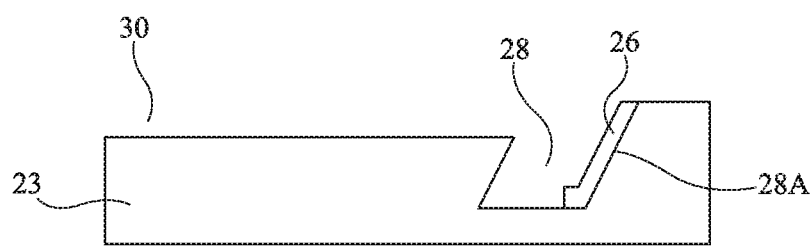

In the step of FIG. 7, the layer of resin 32 is eliminated and the portions of the layer of metal 34 covering it are removed by the same process, using a method known as "lift off". The portion of the layer of metal 34 remaining on the wall 28A of the trench 28 forms the mirror 26.

Figure 8:
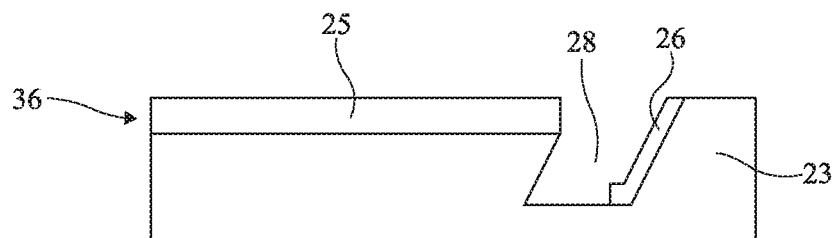

In the step of FIG. 8, the trench 30 is filled with a material 36 having a higher refractive index than that of the glass of the plate 23. The trench 30 filled in this way forms the core 25 of the waveguide 24.

The trench 30 is, for example, filled with the material 36 by a method comprising the successive steps of: 1) depositing a layer of the material 36 on the structure of FIG. 7 in an appropriate way, for example by rolling, and, if the material 36 is a polymer, carrying out reheating for curing;

2) flattening the layer of material 36, by chemical-mechanical planarization for example, to remove the excess material in contact with the surface of the plate 23; and 3) removing the material 36 from the trench 28 by masking.

Figure 9:
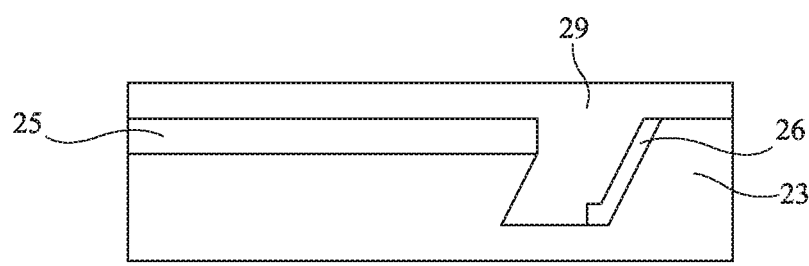

In the step of FIG. 9, the encapsulation layer 29 is deposited on the structure of FIG. 8. The layer 29 fills the trench 28.

Figure 10A:
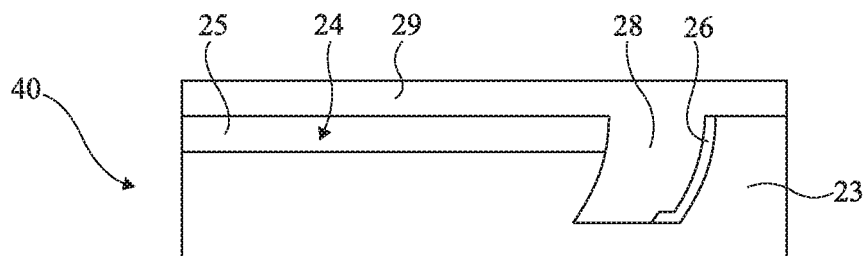
FIGS. 10A and 10B are a sectional view and a top view of a variant embodiment of the optical device of FIG. 2.
Figure 10B:
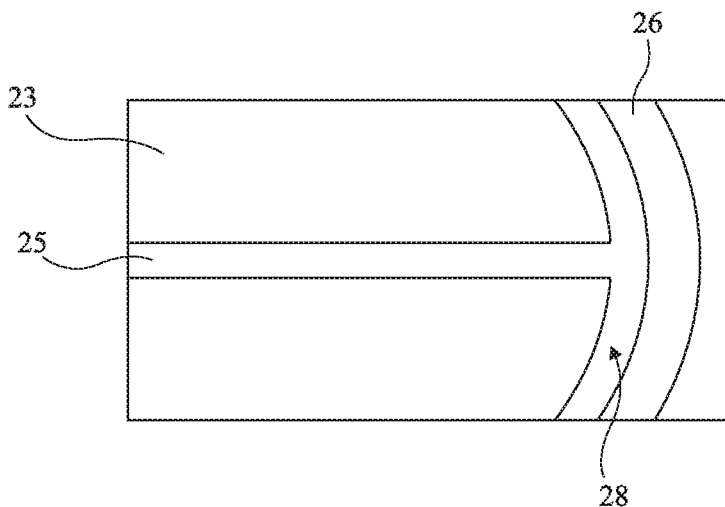

FIGS. 10A and 10B are a sectional view and a top view of a variant 40 of the optical device of FIG. 2. The device 40 comprises the same elements as the device 20, with the difference that the trench 28 and the mirror 26 are curved so as to focus the reflected light at a chosen point.

As shown in FIGS. 10A and 10B, the trench 28 and the mirror 26 may be curved with a curve visible in a top view and with a curve visible in a sectional view. By way of variant, the trench 28 and the mirror 26 could be curved in one direction only.

Particular embodiments have been described. Various modifications and variants will be obvious to those skilled in the art. In particular, a rectilinear waveguide 24 has been illustrated, but the waveguide 24 may be curved.

Various embodiments with various variants have been described above. It should be noted that those skilled in the art will be able to combine various elements of these various embodiments and variants without demonstrating an inventive step.

What is claimed is:

1. A method for manufacturing an optical device, the method comprising:
    forming a first trench in a glass plate according to a design of a waveguide;
    forming a second trench in the glass plate, wherein the second trench crosses the first trench, and wherein the first trench has an open end in a first wall of the second trench;
    treating the glass plate and surfaces of the first and second trenches with hydrofluoric acid;
    covering a second wall of the second trench opposite the first wall with a mirror;
    filling the first trench with a material having a refractive index different from that of the glass plate to form a waveguide comprising a first major outer surface and a second major outer surface that is parallel to the first major outer surface; and
    depositing an encapsulation layer over the glass plate, the waveguide, and the second trench, wherein the encapsulation layer covers all of an upper surface of the waveguide and all of an upper surface of the glass plate, wherein the second trench is filled with the encapsulation layer so that a portion of the encapsulation layer in the second trench separates the waveguide from the mirror, wherein the encapsulation layer filling the second trench and covering all of the upper surface of the waveguide and all of the upper surface of the glass plate has a refractive index that is different from the waveguide and the glass plate, wherein the optical device comprises an optical path between the waveguide and the mirror through the portion of the encapsulation layer.

2. The method according to claim 1, wherein the first trench and the second trench are formed by laser engraving.

3. The method according to claim 2, wherein the first trench and the second trench are formed using a pulsed laser with a duration of pulses in the range from 2 to 500 femtoseconds.

4. The method according to claim 1, wherein the mirror is inclined relative to vertical.

5. The method according to claim 4, wherein the mirror is inclined at an angle in the range from 40 to 50 degrees relative to vertical.

6. The method according to claim 1, wherein the waveguide and mirror are separated by a distance of less than 50 µm.

7. The method according to claim 1, wherein the refractive index of the glass of the glass plate is lower than the refractive index of the material filling the first trench, and the refractive index of the material of the encapsulation layer is lower than the refractive index of the material filling the first trench.

8. The method according to claim 1, wherein the mirror is curved.

9. The method according to claim 1, wherein the mirror comprises aluminum, copper, or an alloy of aluminum and copper.

10. The method according to claim 1, wherein the first trench has a width of 5 to 10 µm.

11. The method according to claim 1, wherein the encapsulation layer comprises silicon oxide or a polymer.

12. The method according to claim 1, wherein the material filling the first trench comprises a polymer.

13. A method of manufacturing an optical device, the method comprising:
    engraving a first trench in a glass plate;
    engraving a second trench in the glass plate obliquely relative to a direction normal to an upper surface of the glass plate, wherein the second trench crosses the first trench, and wherein the first trench has an open end in a first wall of the second trench;
    treating the glass plate and surfaces of the first and second trenches with hydrofluoric acid;
    depositing a resin layer onto the glass plate and surfaces of the first and second trenches;
    removing a portion of the resin layer from a second wall of the second trench opposite the first wall;
    depositing a metal layer over remaining portions of the resin layer and second wall of the second trench;
    removing all remaining portions of the resin layer and any portions of the metal layer covering the resin layer, leaving a portion of the metal layer on the second wall of the second trench to form a mirror;
    filling the first trench with a material having a refractive index different from that of the glass plate to form a waveguide comprising a first major outer surface and a second major outer surface that is parallel to the first major outer surface, wherein the waveguide is separated from the mirror by a distance of less than 50 µm; and
    depositing an encapsulation layer over the glass plate, the waveguide, and the second trench, wherein the second trench is filled with the encapsulation layer so that a portion of the encapsulation layer in the second trench separates the waveguide from the mirror, wherein, after the depositing, the first wall of the second trench and a bottom surface of the second trench are covered with a portion of the encapsulation layer and the second wall of the second trench is covered with the mirror, wherein the optical device comprises an optical path between the waveguide and the mirror through the portion of the encapsulation layer.

14. The method according to claim 13, wherein the engraving comprises laser engraving.

15. The method according to claim 13, wherein the engraving comprises using a pulsed laser with a duration of pulses in the range from 2 to 500 femtoseconds.

16. The method according to claim 13, wherein the mirror is inclined at an angle in the range from 40 to 50 degrees relative to the direction normal to the upper surface of the glass plate.

17. The method according to claim 13, wherein the refractive index of the glass of the glass plate is lower than the refractive index of the material filling the first trench, and the refractive index of the material of the encapsulation layer is lower than the refractive index of the material filling the first trench.

18. The method according to claim 13, wherein the mirror is curved.

19. The method according to claim 13, wherein the mirror comprises aluminum, copper, or an alloy of aluminum and copper, wherein the encapsulation layer comprises silicon oxide or a polymer, and wherein the material filling the first trench comprises a polymer.

20. A method of manufacturing an optical device, the method comprising:
    forming a first trench and a second trench in a glass plate, the second trench comprising a first wall and a second wall opposite the first wall, the first and second walls being inclined relative to a vertical direction normal to an upper surface of the glass plate, wherein the second trench intersects the first trench, and wherein the first trench has an open end in the first wall of the second trench;
    covering the first wall and the second wall with a resin layer;
    removing a portion of the resin layer from the second wall of the second trench;
    forming a mirror covering the second wall;
    filling the first trench with a material having a refractive index different from that of the glass plate to form a waveguide comprising a first major outer surface and a second major outer surface that is parallel to the first major outer surface; and
    depositing an encapsulation layer over the glass plate, waveguide, and the second trench, wherein the encapsulation layer covers all of an upper surface of the waveguide and all of an upper surface of the glass plate, wherein the second trench is filled with the encapsulation layer so that a portion of the encapsulation layer in the second trench separates the waveguide from the mirror, wherein the encapsulation layer filling the second trench and covering all of the upper surface of the waveguide and all of the upper surface of the glass plate has a refractive index that is smaller from the waveguide and the glass plate, wherein the optical device comprises an optical path between the waveguide and the mirror through the portion of the encapsulation layer.

21. The method according to claim 20, wherein the first trench comprises a semi-circular cross section.

22. The method according to claim 20, wherein forming the first trench and the second trench comprises laser engraving followed by hydrofluoric acid etching.

23. The method according to claim 22, wherein the laser engraving comprises using a pulsed laser with a duration of pulses in the range from 2 to 500 femtoseconds.

24. The method according to claim 20, wherein forming the mirror comprises:
    depositing a metal layer over remaining portions of the resin layer and the second wall of the second trench; and
    removing portions of the metal layer covering the resin layer and all of the remaining portions of the resin layer, leaving a portion of the metal layer on the second wall of the second trench to form the mirror.

25. The method according to claim 20, wherein the mirror is inclined at an angle in the range from 40 to 50 degrees relative to the vertical direction.

26. The method according to claim 20, wherein the refractive index of the glass of the glass plate is lower than the refractive index of the material filling the first trench, and the refractive index of the material of the encapsulation layer is lower than the refractive index of the material filling the first trench.

27. The method according to claim 20, wherein the mirror is curved.

28. The method according to claim 20, wherein the mirror comprises aluminum, copper, or an alloy of aluminum and copper, wherein the encapsulation layer comprises silicon oxide or a polymer, and wherein the material filling the first trench comprises a polymer.

29. The method according to claim 1, wherein a difference in the refractive index of the glass plate and the material of the encapsulation layer is on the order of $10^{-5}$.

30. The method according to claim 20, wherein a difference in the refractive index of the glass plate and the material of the encapsulation layer is on the order of $10^{-5}$.

* * * * *